May 25, 1926.  
F. BAILEY ET AL  
1,585,817

APPARATUS FOR STRAINING FLUIDS

Filed July 1, 1925  5 Sheets-Sheet 1

INVENTORS  
Frank Bailey  
Frederick Henry Jackson

May 25, 1926. 1,585,817
F. BAILEY ET AL
APPARATUS FOR STRAINING FLUIDS
Filed July 1, 1925 5 Sheets-Sheet 3

INVENTORS.
Frank Bailey
Frederick Henry Jackson

May 25, 1926. 1,585,817
F. BAILEY ET AL
APPARATUS FOR STRAINING FLUIDS
Filed July 1, 1925 5 Sheets-Sheet 5

INVENTORS.
Frank Bailey
Frederick Henry Jackson

Patented May 25, 1926.

UNITED STATES PATENT OFFICE.

FRANK BAILEY AND FREDERICK HENRY JACKSON, OF SOUTHWARK, LONDON, ENGLAND.

APPARATUS FOR STRAINING FLUIDS.

Application filed July 1, 1925. Serial No. 40,915.

In the specification to British patent granted to us and dated 10th February 1903, No. 3149, is described a self-cleansing strainer comprising a drum-shaped casing, traversed axially by a horizontal shaft, whereon is mounted a wheel, furnished, between its spokes, with grids which serve as straining media; and in the specification to our British patent, dated 12th September 1918, No. 131755, is described a self-cleansing strainer of a similar character wherein, instead of only half the straining surface being effective for straining purposes, a larger proportion thereof is rendered available for that purpose, whilst the cleansing operation is effected through a comparatively small portion thereof.

Our present invention consists in certain improved methods of construction with the same object, and whereby a still larger proportion of the straining surface is rendered available for straining purposes. Inasmuch, moreover, as the strainer-wheel, instead of rotating, is a fixture, the friction, wear and leakage, which have hitherto occurred between the periphery of the straining wheel and its casing are avoided.

Apparatus adapted for carrying our invention into effect is illustrated in the accompanying drawings, whereof Fig. 1 is a vertical section and Fig. 2 a face view, partly in section, of a strainer designed for working under pressure, that is to say, where the fluid to be strained—assumed to be water—passes through a force-pump prior to entering the strainer.

Assuming the appliance to be arranged on the delivery side of a pump, and therefore to work under pressure, the apparatus comprises a cylindrical chamber wherein is fixed a circular strainer, preferably formed as a disc $a$ with radial spokes $a^1$; the spaces between the spokes constituting sector-shaped chambers the backs of which are formed of grids $a^2$, the fronts of the said chambers being open. On the inlet $b$, or unstrained-water side of the strainer-disc, is mounted a box-like chamber $c$ corresponding in form substantially with that of one of the sector-shaped grids; the face of the box presented to the strainer disc being open. For balancing purposes, we prefer to employ two such box-like chambers—hereinafter termed "cleanser-boxes"—and arrange them to extend radially from opposite sides of a slowly rotating hollow shaft $d$. A single cleanser-box may however be employed and a counter-balance weight substituted for the cleanser-box radially opposite. As each cleanser-box arrives over the straining face of one of the grid furnished strainer chambers, a portion of the water which has been strained on its passage through other portions of the strainer disc returns through the strainer chamber temporarily covered by the cleanser-box and flushes the débris off the receiving face of the grid pertaining thereto; this water, together with the flushed off débris, escaping through the cleanser-box $c$ and hollow shaft $d$ back to the source of supply or elsewhere.

The movements of the cleanser-box or boxes are intermittent; and whilst such movements are taking place, it is desirable, in order to reduce friction, to relieve them, so far as possible, from the pressure upon their backs, due to the impact of the incoming water. With this object, we arrange, at the back of each, a shield $e$ which moves in unison with the cleanser-box whilst the latter is moving from opposite one grid to opposite the next in order, and is then withdrawn. On the other hand, when the cleanser-boxes are seated against their respective grids, the pressure, due to the impact of the water upon the backs of the former, is advantageous for the prevention of leakage. The shield or shields $e$ are mounted radially upon a shaft $f$ co-axial with the hollow shaft $d$, and may be employed to shift the cleanser-box or boxes; or the latter may be operated by means of suitably timed but otherwise independent mechanism.

The discharge from the cleanser-box or boxes by way of the hollow shaft $d$ is controlled by an intermittently acting valve which is closed during the angular movement of the cleanser-box, and is only reopened when the latter is properly seated against the grid-furnished straining chamber next in order.

Figure 1:
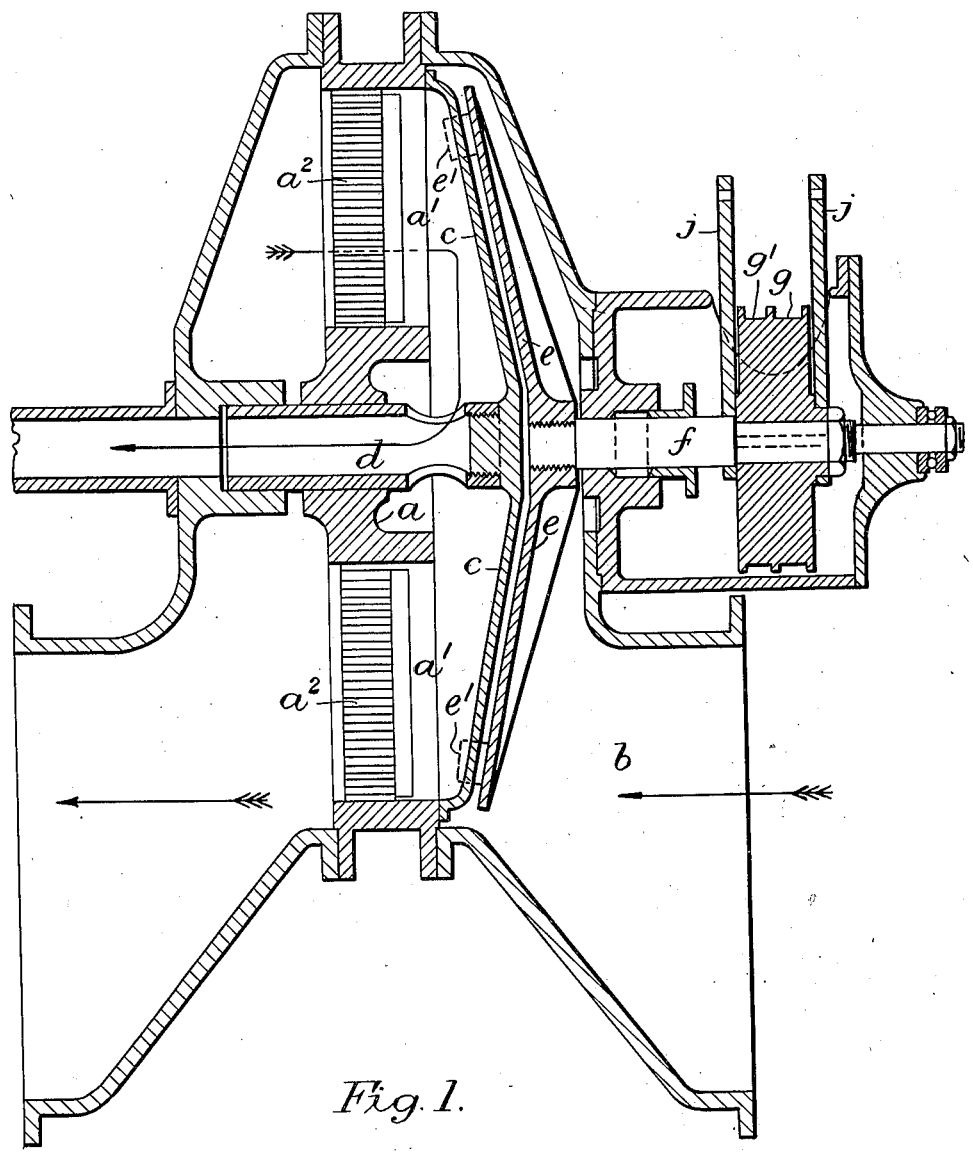
Figure 2:
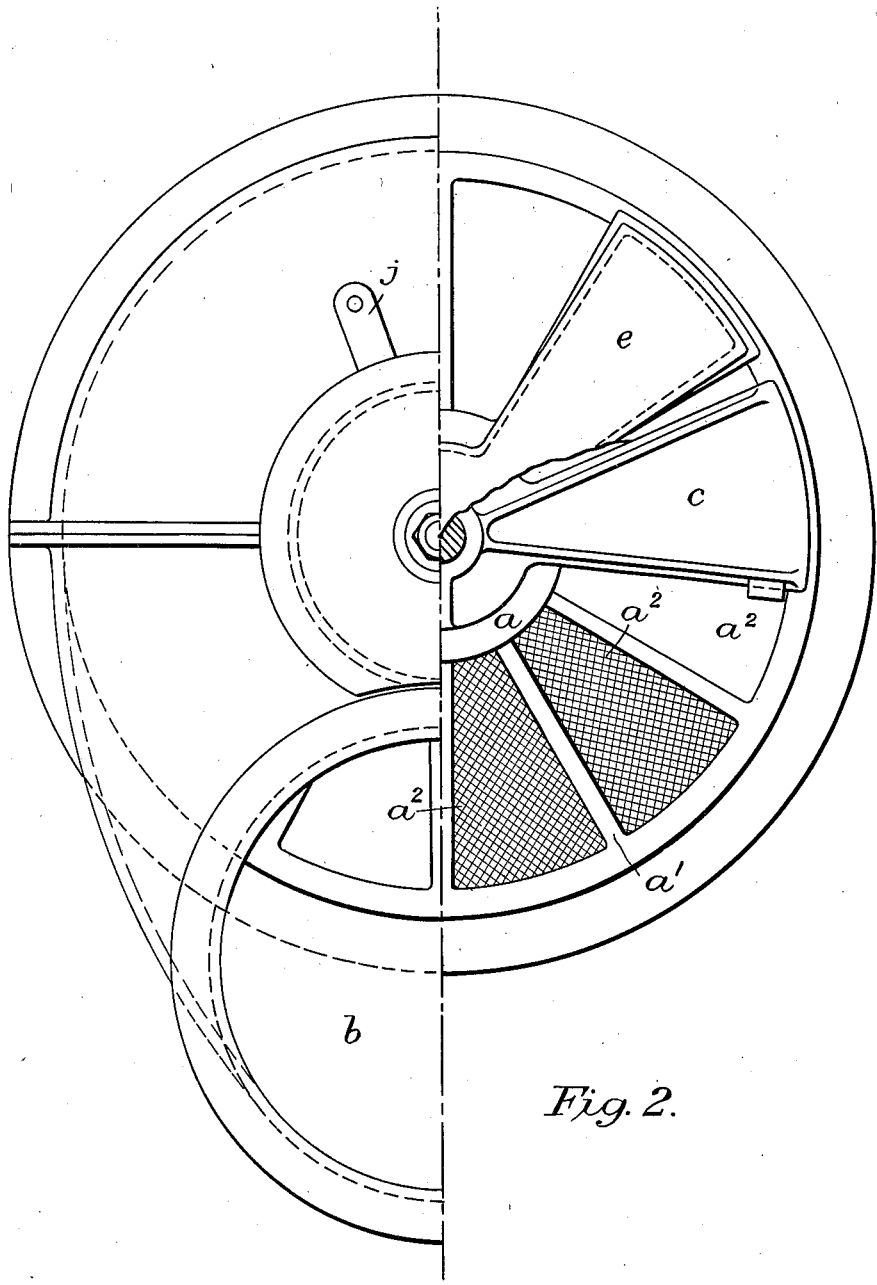
Figure 4:
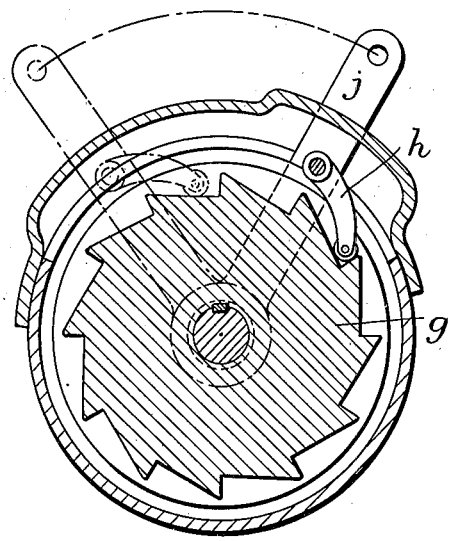
Fig. 3 is an edge view and Figs. 4 and 5 are face views of ratchet and pawl mechanisms for imparting step-by-step rotative movements to certain appliances hereinafter described.
Figure 3:
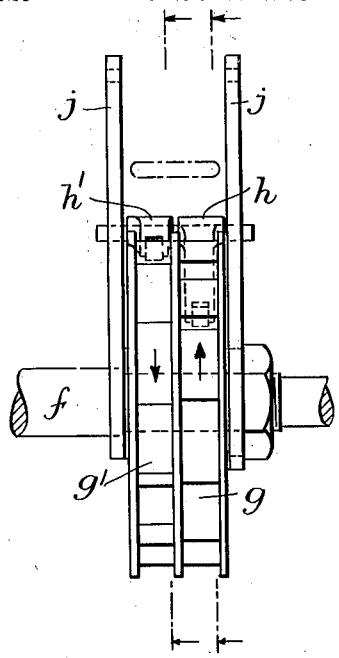
Figure 5:
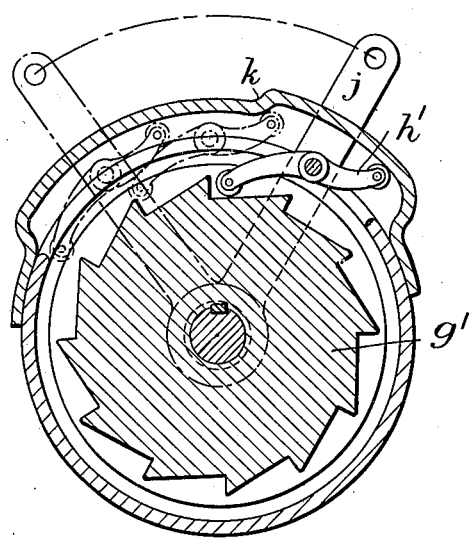

The cleanser-box is mounted on the hollow shaft $d$ but is driven from the shaft $f$ by means of the shield $e$ mounted thereon. Means for operating the shaft $f$ are illustrated in Figs. 3, 4 and 5, and comprise a disc, whereof the periphery is formed with two sets of teeth, the two sets pointing in opposite directions, and a vibrating lever furnished with two pawls, one for each set of teeth. As shown in the edge view Fig. 3 and face views Figs. 4 and 5, the disc carries two sets of ratchet teeth $g$ $g^1$, and pawls $h$ $h^1$ for working therewith are pivotally mounted on the vibrating lever or pair of levers $j$. Upon the lever $j$ moving from left to right, the pawl $h$ rotates the ratchet bearing the teeth $g$ through an arc subtending two teeth. When however the lever $j$ is moved the same angular distance from right to left, the ratchet bearing the teeth $g^1$ is rotated in the reverse direction, but only through an arc corresponding with one tooth by reason of its roller-furnished tail-piece coming into contact with an inwardly projecting portion of the casing $k$, with the effect that the pawl is tripped out of engagement with the ratchet upon the latter having been rotated through an arc corresponding with one tooth only.

The gradual rotation of the cleanser-box in a forward direction is effected by the engagement therewith of the lugs $e^1$ carried by the shield $e$, and the rotative movement of the latter is dependent upon the action of the pair of ratchets whence it derives both forward and backward movements. In moving from opposite one strainer-chamber to opposite the next, the cleanser-box and its shield move in unison, the latter protecting the former from the impact of the water supply. Having arrived at this position, the shield moves back one step, thereby uncovering the strainer-box and leaving it exposed to the full water pressure. The face of the grid pertaining to that strainer chamber having been flushed by the return flow of water, the shield again advances one step, so as to cover the strainer-box, and continues its advances for a second step, the latter portion of this movement being in unison with that of the strainer-box.

Figure 6:
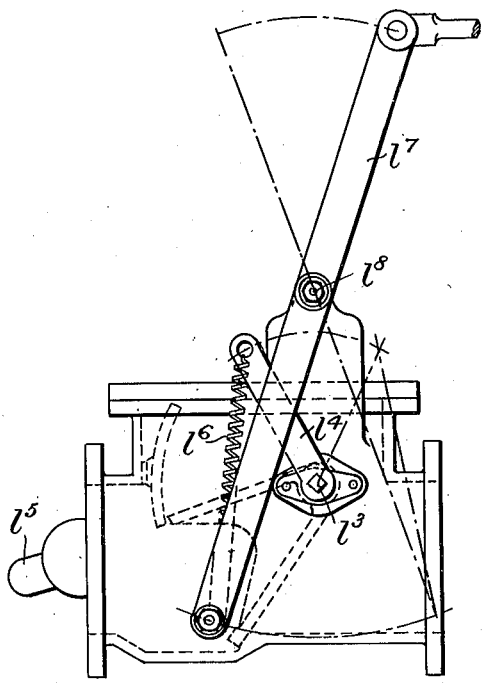
Fig. 6 shows in side elevation and Figs. 7 and 8 in vertical section valve apparatus for controlling the discharge of the flushing water.
Figure 7:
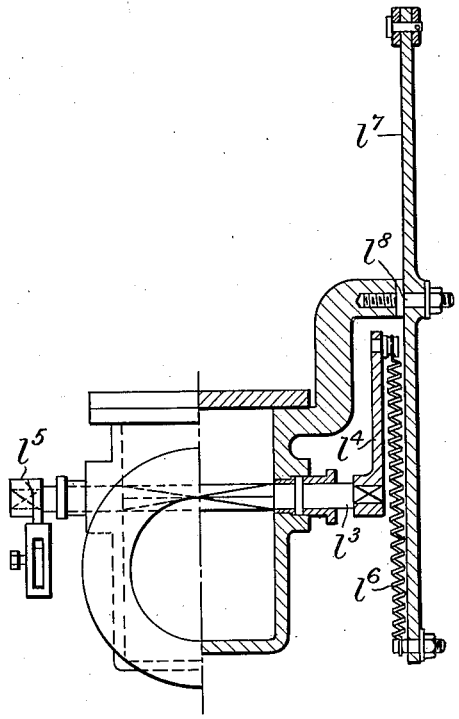
Figure 8:
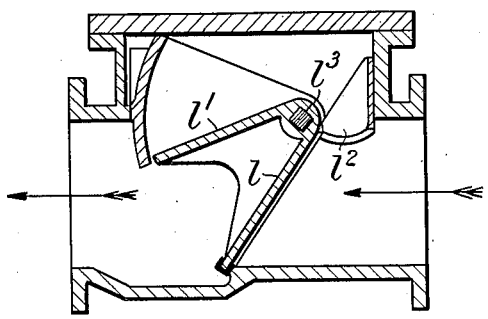

The water employed for cleansing the grids $a^2$ and conveying away the débris removed therefrom may be discharged by way of the hollow shaft $d$ or by way of a radial pipe arranged between two of the strainer-chambers. In either case, its outlet is controlled by a valve operated from the machine by a lever, the working of which is suitably timed. A valve suitable for controlling the discharge from the straining chamber is illustrated in Figs. 6, 7 and 8. The valve is of V-section, has a shut-off flap $l$ and a pressure-balancing flap $l^1$, the pressure-water gaining access to the back of the latter flap by way of the passage $l^2$ with a straining grid. The valve is mounted upon a spindle $l^3$ which passes through glands, arranged in the sides of the valve-casing, and is provided at one end with an arm $l^4$ and at the other end with an arm $l^5$ which latter is furnished with an adjustable weight for balancing purposes. In order to ensure a quick and wide opening for the discharge of débris, and in order to provide against the risk of hard substances lodging under the valve seating and causing damage to the mechanism, this valve is not rigidly connected, but is operated through the agency of a tension-spring $l^6$ which extends from the outer extremity of the arm $l^4$ to the extremity of a lever $l^7$ pivoted at $l^8$. In the position shown in Fig. 6, the tension of the spring tends to hold the flap $l$ of the valve closed upon its seating; but upon the lever $l^7$ being vibrated, the line along which the spring exerts its tensional effort is transferred to the opposite side of the axis of the valve-spindle $l^3$ with the effect that the valve suddenly opens. In like manner, upon the lever $l^7$ being moved in the opposite direction beyond its central position, the valve suddenly closes.

The operation of this valve is timed to open and close whilst the cleanser-box is seated and remains stationary against one of the strainer-chambers, and the valve remains closed during the movement of the cleanser-box to a position opposite the strainer-chamber next in rotation.

Figures 9, 10:
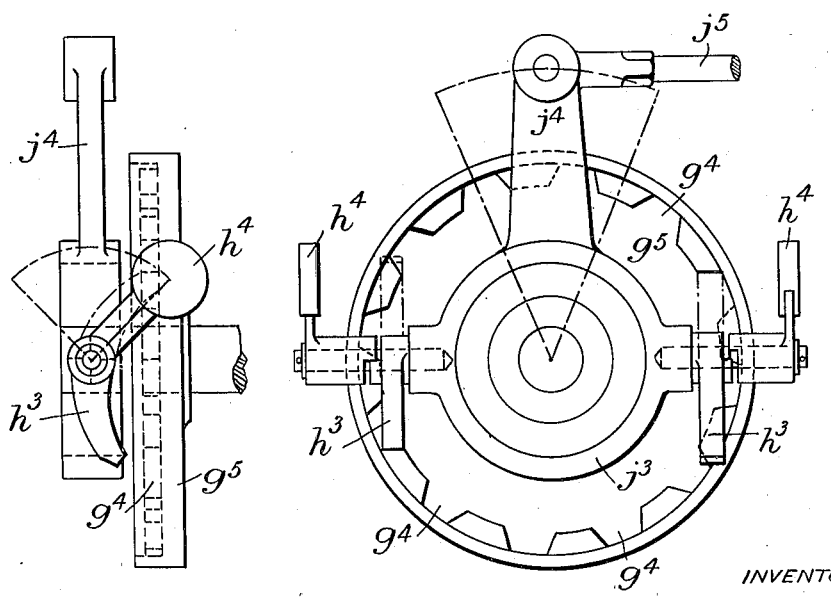
Fig. 9 is a side elevation and Fig. 10 a face view of ratchet and pawl mechanism adapted to enable the strainer to be worked in either direction of rotation.

In order to admit of the strainer-box or boxes being rotated in either direction, we employ a ratchet-wheel formed with recesses in its face, as illustrated in edge view in Fig. 9 and in face view in Fig. 10. A centrally pivoted ring $j^3$ formed with a radially projecting arm $j^4$ is oscillated by means of a reciprocating rod $j^5$. On the opposite sides of the ring $j^3$ are two laterally projecting spindles on each of which is mounted a pawl $h^3$ provided with a weighted arm $h^4$ arranged at such an angle that, when thrown to one or to the other side of the vertical, the pawl will engage with the recesses $g^4$ formed in the face of the wheel $g^5$ or will be held out of engagement therewith. In the latter condition, the pawl on the opposite side is turned about its pivot so as to throw its weighted arm outwards, whereupon its operative arm becomes engaged with the recesses formed in the face of the wheel $g^5$ and the latter is rotated in the opposite direction.

It will be observed that, owing to the oblique angle at which the pawl $h^3$ acts upon the disc $g^5$, the latter is subjected to a lateral thrust which tends to force the cleanser-box away from the face of the straining disc; thereby diminishing the pressure and, during movement, reducing the friction and wear between their faces.

As regards each of the pawl fittings, a second pawl-arm may be added on the opposite side of each of the pawl-pivots, as shown in dotted lines. Under such circumstances, two pawl-arms become operative in either direction of rotation, the total thrust upon the disc, rotatively and laterally, being divided between them.

Figure 11:
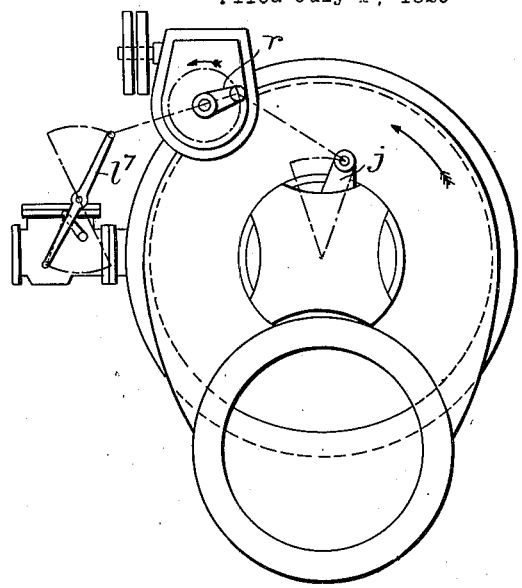
Fig. 11 is a diagrammatic view showing the assemblage of certain parts in their working positions.

In Fig. 11 is illustrated the manner in which certain parts hereinbefore described in detail are or may be assembled; the arm $j$, or $j^5$, for operating the ratchet-pawls $h$, $h^1$, being connected to a revolving crank $r$, to which is also connected the lever $l^r$ for operating the valve $l$ for controlling the escape of the water used in flushing the grids.

The apparatus herein described and claimed is primarily intended for use in straining water; but it will be apparent that the same general principle of construction is equally applicable for treating an aeriform fluid, such as air containing solid impurities. For the purpose of description, we have confined ourselves to water, but we would have it understood that the invention is not restricted to the removal of solid impurities from liquids.

We claim:—

1. A self-cleansing strainer comprising a chamber enclosing a circular straining medium which is stationary and is divided into numerous sectors fitted with straining grids over the faces of which a sector-shaped cleanser-box rotates and, as it arrives over each grid-furnished sector, forms a closed chamber through which a stream of water or other fluid is caused to pass from the back of the grid for the purpose of flushing off and removing the débris previously deposited on its face.

2. In a self-cleansing strainer of the character defined in claim 1, the combination, with a gradually revolving cleanser-box, of a shield arranged behind the latter and serving to protect it from the impact of the water in course of being strained; the said shield serving to shift the cleanser-box to a position opposite each grid-furnished sector in rotation and being then withdrawn from behind the cleanser-box for the period of the grid-flushing operation.

3. In connection with a self-cleansing strainer of the character defined in claim 1, the herein described means for enabling the direction of rotation thereof to be reversed; same comprising a wheel having arranged around its face equally distributed recesses adapted for engagement with one or the other (or both) of two pivoted pawls arranged on opposite sides of its centre; each of these pawls being furnished with a counterweight disposed in such a manner as to hold the pawl in operative engagement or out of engagement with the notches in the face of the wheel, and being mounted in such a manner as to exert a lateral thrust upon the said wheel.

4. In connection with a self-cleansing strainer of the character defined in claim 1, the employment of a partially balanced valve for controlling the discharge of the water employed for flushing the strainer-grids; such valve being adapted to open or close fully and suddenly upon the lever, whereby it is operated, entering upon the second half of its stroke.

FRANK BAILEY.
FREDERICK HENRY JACKSON.